(12) United States Patent  
Shimada et al.

(10) Patent No.: US 9,306,472 B2  
(45) Date of Patent: Apr. 5, 2016

(54) POWER SUPPLY DEVICE OPERATING SWITCHING ELEMENTS OF FIRST AND SECOND SWITCHING LEGS TO CHARGE FIRST AND SECOND CAPACITORS TO A VOLTAGE HIGHER THAN A VOLTAGE CREST VALUE OF AN AC POWER SUPPLY AND METHOD OF OPERATING THE POWER SUPPLY DEVICE

(71) Applicant: HITACHI INFORMATION & TELECOMMUNICATION ENGINEERING, LTD., Kanagawa (JP)

(72) Inventors: Takae Shimada, Tokyo (JP); Akihiko Kanouda, Tokyo (JP); Fumikazu Takahashi, Yokohama (JP); Nobuyuki Aihara, Yokohama (JP)

(73) Assignee: HITACHI INFORMATION & TELECOMMUNICATION ENGINEERING, LTD., Kanagawa (JP)

( * ) Notice: Subject to any disclaimer, the term of this patent is extended or adjusted under 35 U.S.C. 154(b) by 0 days.

(21) Appl. No.: 14/340,762

(22) Filed: Jul. 25, 2014

(65) Prior Publication Data

US 2015/0029772 A1    Jan. 29, 2015

(30) Foreign Application Priority Data

Jul. 26, 2013  (JP) .................................. 2013-155317

(51) Int. Cl.
*H02M 7/48* (2007.01)
*H02M 7/487* (2007.01)

(52) U.S. Cl.
CPC ................ *H02M 7/48* (2013.01); *H02M 7/487* (2013.01); *H02M 2007/4811* (2013.01)

(58) Field of Classification Search
CPC ........................ H02M 7/48; H02M 2007/4811
See application file for complete search history.

(56) References Cited

U.S. PATENT DOCUMENTS 7,440,300 B2 * 10/2008 Konishi et al. ................ 363/132
8,391,033 B2 *  3/2013 Alexander ...................... 363/50

(Continued)

FOREIGN PATENT DOCUMENTS

CN    101765965 A    6/2010
JP    09-140157 A    5/1997

(Continued)

OTHER PUBLICATIONS

Taiwanese Office Action received in corresponding Taiwanese Application No. 10420921380 dated Jul. 14, 2015.

*Primary Examiner* — Jue Zhang
*Assistant Examiner* — Lakaisha Jackson
(74) *Attorney, Agent, or Firm* — Mattingly & Malur, PC (57) ABSTRACT

A power supply device of the invention includes a first switching leg including first and second switching elements between DC terminals; a second switching leg including third and fourth switching elements between the DC terminals; a first capacitor leg including first and second capacitors between the DC terminals; a second capacitor leg including third and fourth capacitors between AC terminals; a first inductor between a connection of the first and second switching elements and one of the AC terminals; a second inductor between a connection of the third and fourth switching elements and another of the AC terminals; a controller; an AC power supply connected to the AC terminals and the connection of the third and fourth capacitors; and a DC power supply between the DC terminals, wherein the controller charges the first and second capacitors to a voltage higher than a voltage crest of the AC power supply.

11 Claims, 5 Drawing Sheets

(56) References Cited

U.S. PATENT DOCUMENTS

| | | | |
|---|---|---|---|
| 2002/0118559 A1* | 8/2002 | Kurokami | H02M 1/15 363/131 |
| 2009/0059625 A1* | 3/2009 | Viitanen | H02M 7/48 363/36 |
| 2010/0090533 A1 | 4/2010 | Shimada et al. | |
| 2010/0188869 A1 | 7/2010 | Fredette et al. | |
| 2012/0002454 A1* | 1/2012 | Kuboyama | H02M 7/487 363/132 |
| 2012/0092915 A1* | 4/2012 | Okuda et al. | 363/132 |

FOREIGN PATENT DOCUMENTS

| | | |
|---|---|---|
| JP | 2002-078350 A | 3/2002 |
| JP | 2008-289211 A | 11/2008 |
| TW | I236519 B | 12/2006 |

\* cited by examiner

POWER SUPPLY DEVICE OPERATING SWITCHING ELEMENTS OF FIRST AND SECOND SWITCHING LEGS TO CHARGE FIRST AND SECOND CAPACITORS TO A VOLTAGE HIGHER THAN A VOLTAGE CREST VALUE OF AN AC POWER SUPPLY AND METHOD OF OPERATING THE POWER SUPPLY DEVICE

CLAIM OF PRIORITY

The present application claims priority from Japanese Patent Application JP 2013-155317 filed on Jul. 26, 2013, the content of which is hereby incorporated by reference into this application.

FIELD OF THE INVENTION

The present invention relates to a power supply device which converts power between direct current and alternating current and a method of operating the device.

BACKGROUND OF THE INVENTION

In recent years, as awareness of global environment conservation increases, systems having a direct-current power supply such as a storage cell, a solar cell or a fuel cell are being developed. Those systems need a power supply device for converting direct-current (DC) power generated by a storage cell, a solar cell, a fuel cell, or the like to an alternating-current (AC) power and supplying the AC power to a load or a commercial power supply. In the case of charging a storage cell from a commercial power supply, it is necessary to convert the AC power of the commercial power supply to DC power and supply the DC power to the storage cell.

Japanese Unexamined Patent Application Publication No. 2002-78350 (Document 1) discloses a single-phase three-wire AC/DC bidirectional converter. The converter realizes charging of a cell from a single-phase three-wire AC power supply and power regeneration to the single-phase three-wire AC power supply by discharging the cell in a single circuit, aiming to realize smaller size and lower cost.

Japanese Unexamined Patent Application Publication No. 2008-289211 (Document 2) and Japanese Unexamined Patent Application Publication No. 9-140157 (Document 3) also disclose inverters adapted to a single-phase three-wire system.

In the case of performing backup of an AC load at the time of interruption of power supply of a commercial power system by using any of the power supply devices, which output a single-phase three-wire AC voltage, disclosed in Documents 1 to 3, the power supply device has to be in a standby state in which DC voltage is always supplied to the power supply device to promptly output the single-phase three-wire AC voltage from the power supply device.

However, two capacitors are connected in series between DC lines, which are DC input terminals, of each of those power supply devices and, generally, leakage current flows in the capacitors. In some cases, an auxiliary power supply for control is connected between the DC lines. Therefore, when the power supply device stands by in a state where DC voltage is supplied, DC power is consumed. In the case where the DC power supply is a battery, there is a problem that the battery gradually discharges.

There is a case that leakage current values vary among parts due to individual variability in two capacitors connected in series between DC lines. The voltages in the capacitors have to be balanced to some extent to maintain both of two capacitors connected in series in a charged state in order to promptly output a single-phase three-wire AC voltage. However, there is a problem that a loss will be large when a circuit for balancing voltages is provided and operated.

An object of the present invention is to provide a power supply device which has a small loss in a standby state when backup of an AC load is performed by outputting a single-phase three-wire AC voltage, and to provide a method of operating the device.

SUMMARY OF THE INVENTION

To achieve the object, a power supply device of the present invention comprises a first switching leg in which a series circuit of a first switching element and a second switching element is connected between DC terminals; a second switching leg in which a series circuit of a third switching element and a fourth switching element is connected between the DC terminals; a first capacitor leg in which a series circuit of a first capacitor and a second capacitor is connected between the DC terminals; a second capacitor leg in which a series circuit of a third capacitor and a fourth capacitor is connected between AC terminals and in which a connection point of the third and fourth capacitors and a connection point of the first and second capacitors are connected by a neutral point connection line; a first inductor connected between a connection point of the first and second switching elements and one of the AC terminals; a second inductor connected between a connection point of the third and fourth switching elements and another of the AC terminals; a controller configured to control the first to fourth switching elements; an AC power supply connected to the AC terminals and the connection point of the third and fourth capacitors, in parallel to the second capacitor leg; and a DC power supply connected between the DC terminals, wherein the controller is configured to operate the switching elements of the first and second switching legs so as to charge the first and second capacitors to a voltage higher than a voltage crest value of the AC power supply by using power of the AC power supply.

To achieve the object, in a method of operating a power supply device of the present invention, the device comprises a first switching leg in which a series circuit of a first switching element and a second switching element is connected between DC terminals; a second switching leg in which a series circuit of a third switching element and a fourth switching element is connected between the DC terminals; a first capacitor leg in which a series circuit of a first capacitor and a second capacitor is connected between the DC terminals; a second capacitor leg in which a series circuit of a third capacitor and a fourth capacitor is connected between AC terminals and in which a connection point of the third and fourth capacitors and a connection point of the first and second capacitors are connected by a neutral point connection line; a first inductor connected between a connection point of the first and second switching elements and one of the AC terminals; a second inductor connected between a connection point of the third and fourth switching elements and another of the AC terminals; a controller configured to control the first to fourth switching elements; an AC power supply and a load connected to the AC terminals and the connection point of the third and fourth capacitors, the AC power supply and the load in parallel to each other; and a DC power supply connected between the DC terminals, and the method comprises a step of operating the switching elements of the first and second switching legs by the controller in a normal operation state of supplying power from the AC power supply to the load, so as to charge the first and second capacitors to a voltage higher than a voltage crest value of the AC power supply by using power of the AC power supply.

According to the invention, a power supply device in which a loss in a standby state is small and which performs backup of an AC load by outputting a single-phase three-wire AC voltage and a method of operating the device can be provided.

DETAILED DESCRIPTION OF THE PREFERRED EMBODIMENTS

Hereinafter, embodiments of the present invention will be described specifically with reference to the drawings.

Figure 1:
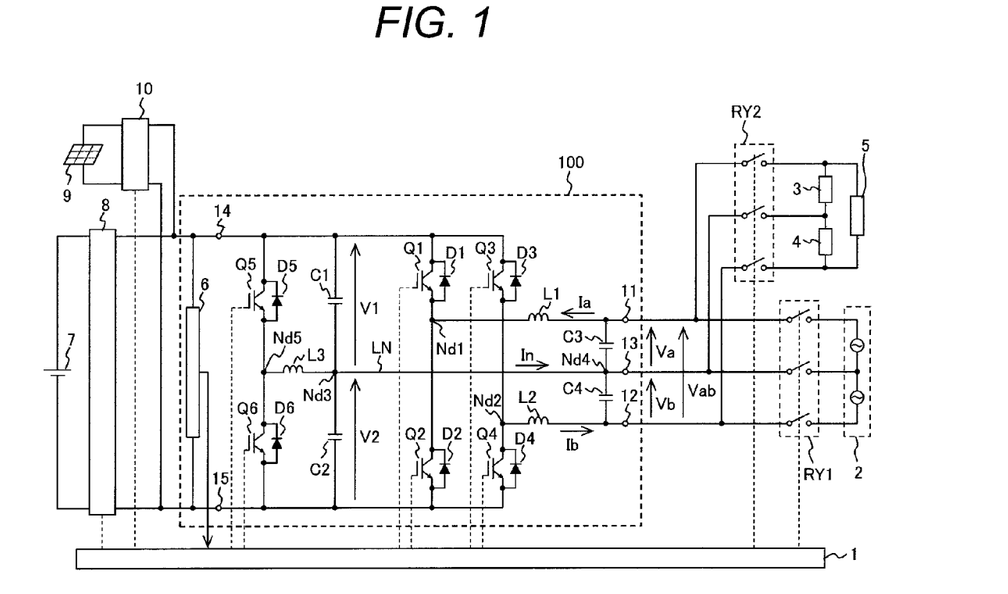
FIG. 1 is a circuit configuration diagram of a power supply device of an embodiment of the present invention.

FIG. 1 is a circuit configuration diagram of a power supply device according to an embodiment of the present invention. In a power supply device 100, power is transmitted and received between direct-current (DC) lines connected to direct-current (DC) terminals 14 and 15 and alternating-current (AC) lines connected to alternating-current (AC) terminals 11 to 13. To the DC terminals 14 and 15, a battery 7 is connected via a converter 8, and a solar cell 9 is connected via a converter 10. To the AC terminals 11 to 13, an alternating-current (AC) power supply 2 is connected via a relay contact RY1, and alternating-current (AC) loads 3 to 5 are connected via a relay contact RY2.

The AC power supply 2 is of a single-phase three-wire system and can supply 100V in two systems and 200V in one system. A voltage approximately 85V to 132V is widely used as the voltage of the 100V system, and a voltage approximately 170V to 265V is widely used as the voltage of the 200V system. In the embodiment, it is assumed that a load of the 100V system is used for the AC loads 3 and 4, and a load of the 200V system is used for the AC load 5.

The power supply device 100 includes a first switching leg in which switching elements Q1 and Q2 are connected in series at a node Nd1, a second switching leg in which switching elements Q3 and Q4 are connected in series at a node Nd2, a first capacitor leg in which capacitors C1 and C2 are connected in series at a node Nd3, a second capacitor leg in which capacitors C3 and C4 are connected in series at a node Nd4, and a third switching leg in which switching elements Q5 and Q6 are connected in series at a node Nd5.

The first to third switching legs and the first capacitor leg are connected in parallel to each other. The negative electrode of the capacitor C1 and the positive electrode of the capacitor C2 are connected to each other. An inductor L1 is connected between one end (capacitor C3) of the second capacitor leg and the node Nd1. An inductor L2 is connected between the other end (capacitor C4) of the second capacitor leg and the node Nd2. An inductor L3 is connected between the nodes Nd3 and Nd5. The nodes Nd3 and Nd4 are connected to each other by a neutral point connection line LN.

Diodes D1 to D6 are connected to the switching elements Q1 to Q6, respectively, in inverse-parallel connection.

However, the diodes D1 to D6 can be omitted if MOSFETs are used as the switching elements Q1 to Q6 because parasite diodes of the MOSFETs can be used.

The positive electrode of the capacitor C1 is connected to the DC terminal 14, and the negative electrode of the capacitor C2 is connected to the DC terminal 15. A voltage V1 of the capacitor C1 is defined with the positive electrode of the capacitor C1 positive, and a voltage V2 of the capacitor C2 is defined with the positive electrode of the capacitor C2 positive.

A connection point of the inductor L1 and the capacitor C3 is set as the AC terminal 11. A connection point of the inductor L2 and the capacitor C4 is set as the AC terminal 12. A connection point of the capacitors C3 and C4 is set as the AC terminal 13. An a-phase is defined between the AC terminals 11 and 13, that is, both ends of the capacitor C3. A b-phase is defined between the AC terminals 13 and 12, that is, both ends of the capacitor C4. An ab-phase is defined between the alternating-current terminals 11 and 12, that is, both ends of the second capacitor leg. A voltage of the AC terminal 11 for the AC terminal 13 is defined as an a-phase voltage Va. A voltage of the AC terminal 13 for the AC terminal 12 is defined as a b-phase voltage Vb. A voltage of the AC terminal 11 for the AC terminal 12 is defined as an ab-phase voltage Vab. The a-phase voltage Va, the b-phase voltage Vb, and the ab-phase voltage Vab are collectively called phase voltages.

The direction of current In of the neutral point connection line LN is defined as positive flowing from the node Nd3 to the node Nd4. The direction of current Ia of the inductor L1 is defined as positive flowing from the AC terminal 11 to the inductor L1. The direction of current Ib of the inductor L2 is defined as positive flowing from the inductor L2 to the AC terminal 12.

The battery 7 is connected in parallel to the first capacitor leg via the converter 8. The solar cell 9 is connected in parallel to the first capacitor leg via the converter 10. The AC power supply 2 is connected to the AC terminals 11 to 13 via the relay contact RY1 so that the AC terminal 13 is connected to the neutral line of the single-phase three-wire system. The AC loads 3, 4, and 5 are connected to the a-phase, the b-phase, and the ab-phase, respectively, via the relay contact RY2.

The switching operation of the switching elements Q1 to Q6 and the relay contacts RY1 and RY2 are controlled by a controller 1. An auxiliary power supply 6 for supplying power to the controller 1 is connected between the DC terminals 14 and 15.

The capacitors C1 and C2 divide the voltage between the DC terminals 14 and 15, and an intermediate voltage of the voltage between the DC terminals 14 and 15 is generated at Nd3. The switching elements Q5 and Q6 and the inductor L3 make the voltage sharing of the capacitors C1 and C2 balanced by controlling the switching elements Q5 and Q6. In the embodiment, the converters 8 and 10 are connected in parallel to the first capacitor leg as DC power supplies. The converters 8 and 10 may be connected in parallel to one or both of the capacitors C1 and C2.

The power supply device 100 in FIG. 1, configured as described above, is operated as follows. In the operation, four modes below are performed: a commercial power supply mode (A) of supplying power from the AC power supply 2 to the AC loads 3 to 5, a battery charge mode (B) when the battery 7 is not in a full charge state in the commercial power supply mode, a capacitor charge mode (C) after completion of charging the battery in the commercial power supply mode, and a battery power supply mode (D) at a time of power interruption of AC power supply 2. Having performed the four modes, the operation returns to the commercial power supply mode (A) after the AC power supply 2 recovers.

The present invention has a feature that, in the series of processes, the capacitor charge mode after completion of charging the battery is performed in the commercial power supply mode. In the following, the processes will be sequentially described in accordance with the operation procedure.

[Commercial Power Supply Mode (A)]

In the commercial power supply mode, the relay contacts RY1 and RY2 are set to the on-state, and power of the AC power supply 2 is supplied to the alternating-current loads 3 to 5 in FIG. 1.

[Battery Charge Mode (B) when Battery 7 is not in Full Charge State in Commercial Power Supply Mode]

When the battery 7 is not in the full charge state in the commercial power supply mode, the power of the AC power supply 2 is converted into direct current, the direct current is output to the DC terminals 14 and 15, and the converter 8 is operated to charge the battery 7. In this case, the power supply of the battery 7 is the capacitors C1 and C2. Consequently, the charging operation of charging the capacitors C1 and C2 from the AC power supply 2 will be described. In the charging operation, the capacitors C1 and C2 are charged by using AC100/200V as inputs.

Figure 2:
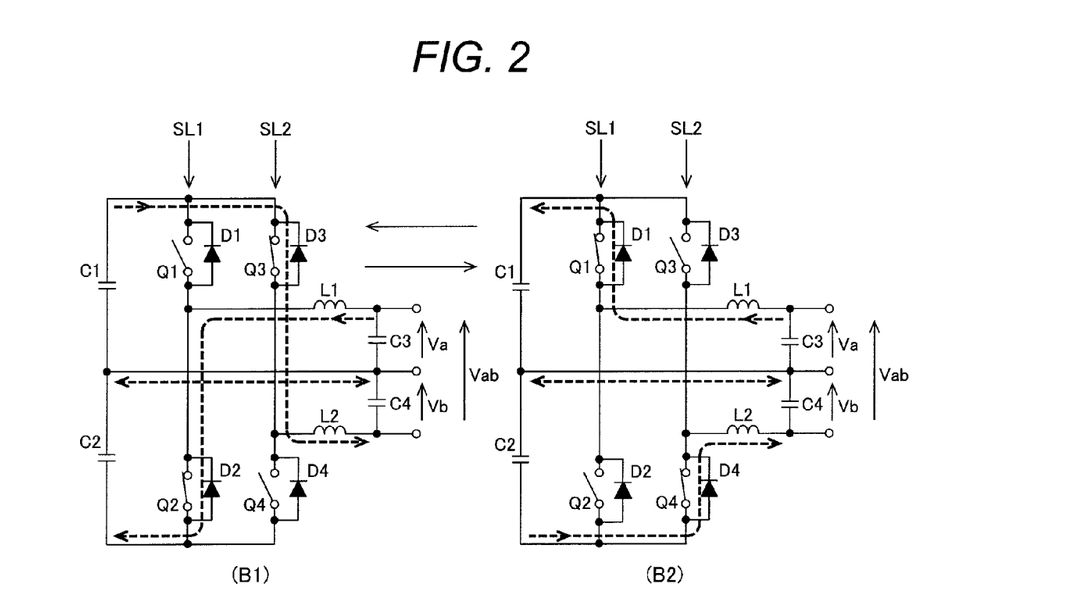
FIG. 2 is a diagram illustrating circuit operation in a battery charge mode (B)

With reference to FIG. 2, the charging operation of supplying power from the capacitors C3 and C4 to the capacitors C1 and C2, receiving AC100V from both the a-phase and the b-phase, and receiving AC200V from the ab-phase will be described. In the description below, only a half cycle in which the AC voltage is positive will be described.

In this charging operation, the switching elements Q1 to Q4 will be operated as follows. In the switching operation, a mode B1 and a mode B2 are alternately executed. In the mode B1, the switching element Q2 on the negative terminal side of a first switching leg SL1 and the switching element Q3 on the positive terminal side of a second switching leg SL2 are set to the on-state, and the others are set to the off-state. In the mode B2, the switching element Q1 on the positive terminal side of the first switching leg SL1 and the switching element Q4 on the negative terminal side of the second switching leg SL2 are set to the on-state, and the others are set to the off-state. The left part in FIG. 2 illustrates the circuit configuration, the current directions, and so on in the mode B1, and the right part in FIG. 2 illustrates the circuit configuration, the current directions, and so on in the mode B2.

In the mode B1, the switching element Q2 is in the on-state, and the voltage of the capacitor C3 is applied to the inductor L1 via the capacitor C2. In addition, the switching element Q3 is in the on-state, and the voltage of the capacitor C4 is applied to the inductor L2 via the capacitor C1. The energy of the capacitors C3 and C4 is accumulated in the inductors L1 and L2.

When the switching element Q2 is turned off in the mode B2, the current in the inductor L1 flowing in the switching element Q2 changes to flow into the diode D1 and is supplied to the capacitor C1. At this time, the switching element Q1 is turned on. When the switching element Q3 is turned off, the current in the inductor L2 flowing in the switching element Q3 changes to flow into the diode D4 and is supplied to the capacitor C2. At this time, the switching element Q4 is turned on. The currents in the inductors L1 and L2 decrease with time.

By continuous execution of the switching operation between the modes B1 and B2, power is supplied from the capacitors C3 and C4 to the capacitors C1 and C2. The operation of operating the converter 8 to charge the battery 7 will not be described here. At this time, AC100V is applied to both of the a-phase and the b-phase, and AC200V is applied to the ab-phase.

[Capacitor Charge Mode (C) after Completion of Charging Battery in Commercial Power Supply Mode]

After completion of charging the battery 7, the capacitors C1 and C2 are charged by using the power of the AC power supply 2 in preparation for interruption of power supply of the AC power supply 2 and the like. This charge mode is performed so that the device can promptly shift to the battery power supply mode immediately after the interruption of the AC power supply 2.

To prevent the AC loads 3 to 5 from interruption of power supply, AC voltage has to be promptly output from the power supply device 100 at the time of switching from the commercial power supply mode to the battery power supply mode. However, the power supply device 100 can output only voltage equal to or less than the voltages of the capacitors C1 and C2 as the a-phase voltage Va and the b-phase voltage Vb. Therefore, the capacitors C1 and C2 need to be charged to voltages higher than crest values of the a-phase voltage Va and the b-phase voltage Vb, which are output, at the standby time of the commercial power supply mode. This state corresponds to the capacitor charge mode (C). The present invention is mainly characterized by the capacitor charge mode (C).

The battery 7 can be used as a power supply for charging the capacitors C1 and C2 to voltages higher than the crest values of the a-phase voltage Va and the b-phase voltage Vb, which are output. However, there is leakage current of the capacitors C1 and C2 and power is consumed by the auxiliary power supply 6. Consequently, the battery 7 gradually discharges when the device stands by while charging the capacitors C1 and C2 from the battery 7 via the converter 8.

In a case where leakage current values in the capacitors C1 and C2 are different from each other due to individual variability, the voltages may be unbalanced between the capacitors. When the switching elements Q5 and Q6 are operated to balance the voltages, a loss will be large although the power necessary to charge the capacitors C1 and C2 while the device is on standby is relatively small.

In the power supply device 100 of the embodiment, at the time of standby in the commercial power supply mode, the capacitors C1 and C2 are charged to voltages higher than the crest values of the a-phase voltage Va and the b-phase voltage Vb by using the power of the AC power supply 2. Consequently, the charge state of the capacitors C1 and C2 is maintained without discharging the battery 7, and backup of the AC loads 3 to 5 can be performed by promptly outputting AC voltage in a case of abnormality in the system such as blackout.

Further, in the power supply device 100, charging of the capacitors C1 and C2 is performed while only the switching elements Q1 and Q2 are operated among the switching elements Q1 to Q6 with the switching elements Q3 to Q6 stopped, and the voltages of the capacitors C1 and C2 are balanced. Consequently, the number of switching elements for performing switching operation is small as two, and it is unnecessary to operate the switching elements Q5 and Q6 for balancing the voltages of the capacitors C1 and C2, so that a switching loss and iron loss of the inductor L3 can be reduced.

Hereinafter, operation will be described in which, by controlling the switching elements Q1 and Q2, power is supplied from the a-phase of the AC power supply 2 connected to both ends of the capacitor C3 and charging of the capacitors C1 and C2 is performed with the voltages of the capacitors C1 and C2 balanced. In a case of supplying power from the b-phase of the AC power supply 2 connected to both ends of the capacitor C4, the switching elements Q3 and Q4 will be controlled. In this case, the switching elements Q3 to Q6 are fixed in the off-state.

In the capacitor charge mode (C), different operations are performed in a half cycle in which the voltage of the AC power supply 2 is positive in the alternating current and a half cycle in which the voltage of the AC power supply 2 is negative. The operations will be described with reference to FIGS. 3 and 4.

Figure 3:
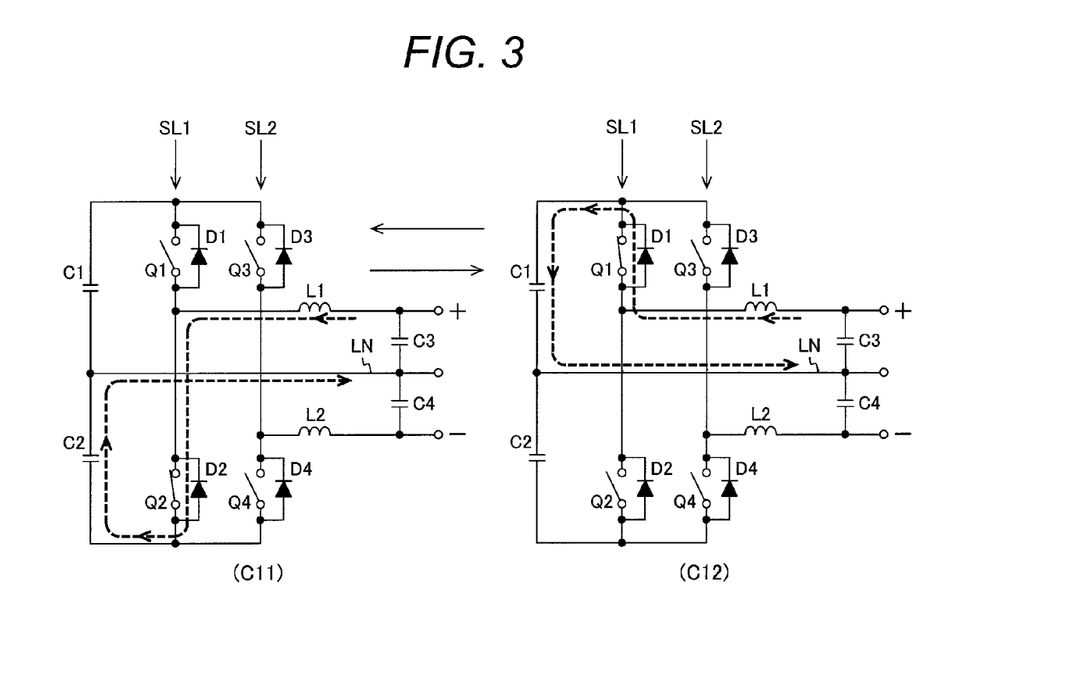
FIG. 3 is a diagram illustrating circuit operation in positive half-wave in a capacitor charge mode (C)

With reference to FIG. 3, a circuit operation will be described in the half cycle in which the voltage of the AC power supply 2 is positive in the alternating current, that is, in a period in which the a-phase voltage Va is positive. In FIGS. 3, C11 and C12 indicate circuit operations in a lower-arm conduction mode C11 and an upper-arm conduction mode C12, respectively. Although the operations are executed by using the first switching leg (switching elements Q1 and Q2), they may be executed by using the second switching leg (switching elements Q3 and Q4). In a case of using the second switching leg (switching elements Q3 and Q4), an operation of supplying power from the b-phase is performed.

[Lower-Arm Conduction Mode C11]

The switching element Q2 is in the on-state and the switching element Q1 is in the off-state in the first switching leg, and the second switching leg (switching elements Q3 and Q4) is in the off-state. In this case, a circuit including capacitor C3, inductor L1, switching element Q2, capacitor C2, neutral point connection line LN, and capacitor C3 in this order is formed. The a-phase voltage Va is applied to the inductor L1 via the capacitor C2, and the current Ia of the inductor L1 increases.

[Upper-Arm Conduction Mode C12]

The switching element Q1 is in the on-state and the switching element Q2 is in the off-state in the first switching leg, and the second switching leg (switching elements Q3 and Q4) is in the off-state. In this case, a circuit including capacitor C3, inductor L1, switching element Q1, capacitor C1, neutral point connection line LN, and capacitor C3 in this order is formed. In a transient state of forming the circuit, when the switching element Q2 is turned off, the current of the inductor L1 flowing in the switching element Q2 changes to flow in the diode D1 parallel to the switching element Q1 and flows in the capacitor C1. At this time, the switching element Q1 is turned on. The current Ia in the inductor L1 decreases.

After that, the switching element Q1 is turned off and the switching element Q2 is turned on, thereby returning to the mode C11. Switching between the modes C11 and C12 is repeatedly executed by an output of the controller 1. In the controller 1, a firing time point and a firing period of the switching elements Q1 and Q2 are controlled by a voltage instruction signal and PWM control using, for example, a triangular wave.

Figure 4:
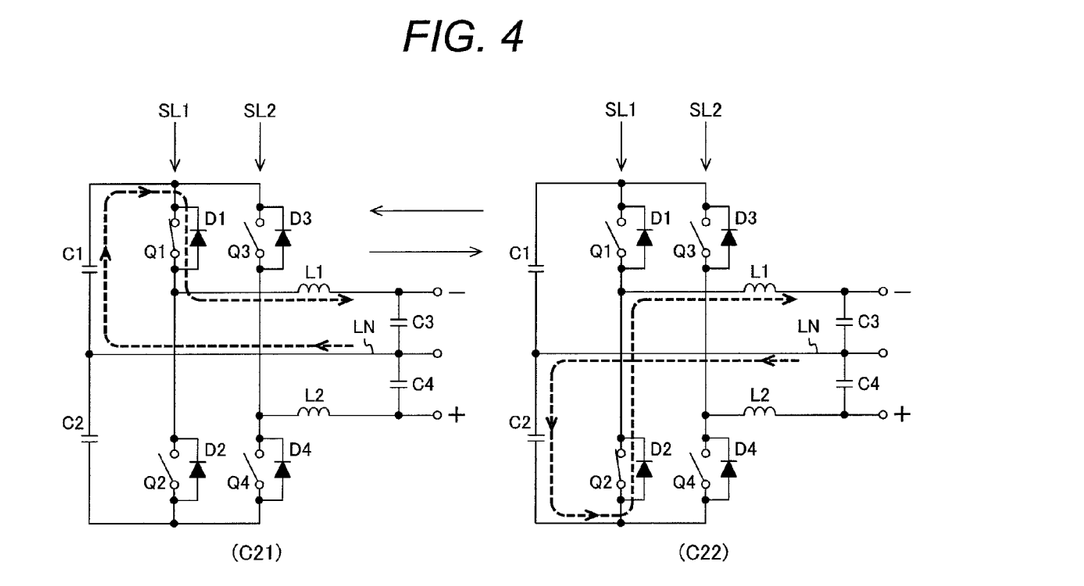
FIG. 4 is a diagram illustrating circuit operation in negative half-wave in the capacitor charge mode (C)

With reference to FIG. 4, a circuit operation will be described in the half cycle in which the voltage of the AC power supply 2 is negative in the alternating current, that is, in a period in which the a-phase voltage Va is negative. In FIGS. 4, C21 and C22 indicate circuit operations in an upper-arm conduction mode C21 and a lower-arm conduction mode C22, respectively. Although the operations are executed by using the first switching leg (switching elements Q1 and Q2), they may be executed by using the second switching leg (switching elements Q3 and Q4). In a case of using the second switching leg (switching elements Q3 and Q4), an operation of supplying power from the b-phase is performed.

[Upper-Arm Conduction Mode C21]

The switching element Q1 is in the on-state and the switching element Q2 is in the off-state in the first switching leg, and the second switching leg (switching elements Q3 and Q4) is in the off-state. In this case, a circuit including capacitor C3, neutral point connection line LN, capacitor C1, switching element Q1, inductor L1, and capacitor C3 in this order is formed. The a-phase voltage Va is applied to the inductor L1 via the capacitor C1, and the current Ia of the inductor L1 increases in the negative direction.

[Lower-Arm Conduction Mode C22]

The switching element Q2 is in the on-state and the switching element Q1 is in the off-state in the first switching leg, and the second switching leg (switching elements Q3 and Q4) is in the off-state. In this case, a circuit including capacitor C3, neutral point connection line LN, capacitor C2, switching element Q2, inductor L1, and capacitor C3 in this order is formed. In a transient state of forming the circuit, when the switching element Q1 is turned off, the current of the inductor L1 flowing in the switching element Q1 changes to flow in the diode D2 parallel to the switching element Q2 and flows in the capacitor C2. At this time, the switching element Q2 is turned on. The current Ia in the inductor L1 decreases in the positive direction.

After that, the switching element Q2 is turned off and the switching element Q1 is turned on, thereby returning to the mode C21. Switching between the modes C21 and C22 is repeatedly executed by an output of the controller 1.

In the above-described operation, the current In of the neutral point connection line LN is equal to the current Ia of the inductor L1 because the second switching leg (switching elements Q3 and Q4) is fixed in the off-state and the current Ib of the inductor L2 does not flow. According to the above-described control, it is possible to control the current value when the current In of the neutral point connection line LN flows in the positive direction by adjusting the ratio between the length of the period of the mode C11 and the length of the period of the mode C12, and to control the current value when the current In of the neutral point connection line LN flows in the negative direction by adjusting the ratio between the length of the period of the mode C21 and the length of the period of the mode C22.

Figure 5:
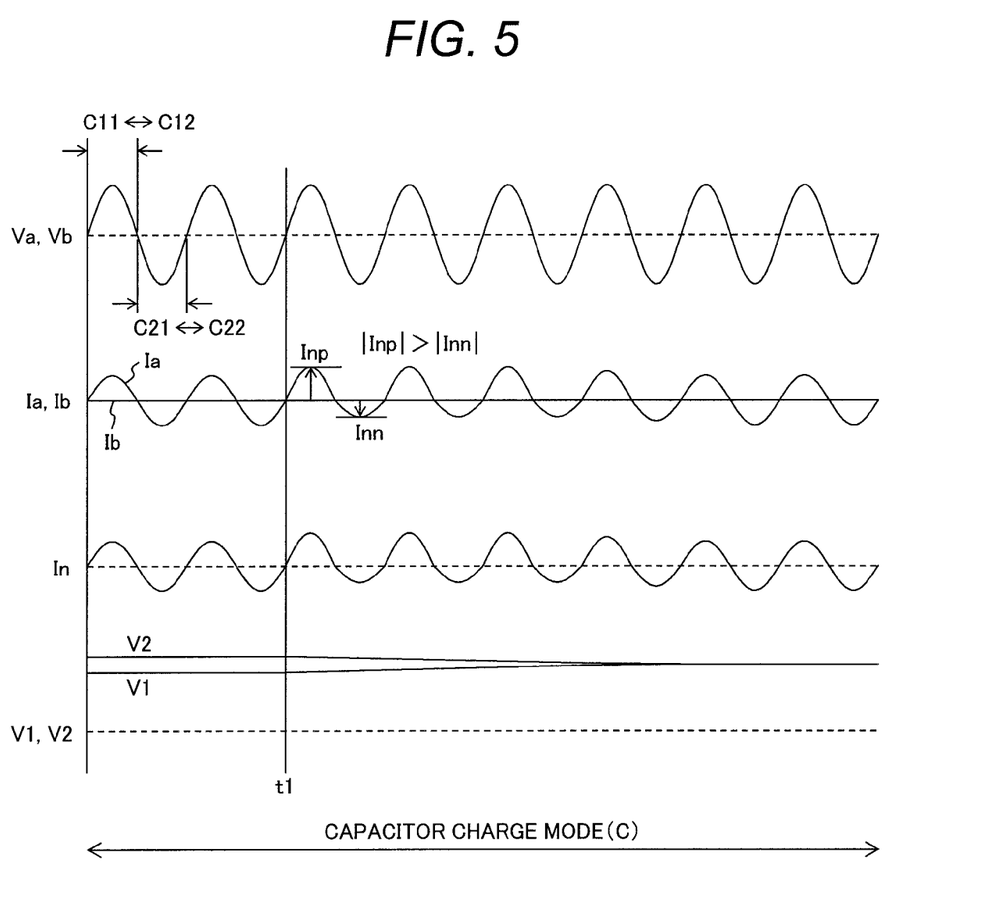
FIG. 5 is a diagram illustrating signals in parts changing with time in the capacitor charge mode (C)

FIG. 5 illustrates signals in parts changing with time in the capacitor charge mode (C). FIG. 5 illustrates, as an example, time change of the AC terminal voltages Va and Vb, the respective currents Ia and Ib of the inductors L1 and L2, the current In of the neutral point connection line LN, and the respective voltages V1 and V2 of the capacitors C1 and C2. It is assumed that the voltages V1 and V2 of the capacitors C1 and C2 have different voltage values with each other in a state before time t1. It is also assumed that repetitive control of the modes C11 and C12 is executed in the period of the positive half wave of the AC terminal voltages Va and Vb, and repetitive control of the modes C21 and C22 is executed in the period of the negative half wave of the AC terminal voltages Va and Vb.

With reference to FIG. 5, the operation sequence of the power supply device of the embodiment will be described. When the phase of the a-phase voltage Va and that of the current Ia of the inductor L1 is close to each other, power is supplied from the a-phase of the AC power supply 2. Consequently, the current In of the neutral point connection line LN is equal to the current Ia of the inductor L1 because only the switching elements Q1 and Q2 are operated and the switching elements Q3 and Q4 are fixed in the off-state.

If the voltage V1 of the capacitor C1 is lower than the voltage V2 of the capacitor C2 in the above-described state (the state before time t1), the positive crest value Inp of the current In of the neutral point connection line LN is made larger than the negative crest value Inn after the time t1, increasing the amount of the charge current of the capacitor C1. On the other hand, if the voltage V2 of the capacitor C2 is lower than the voltage V1 of the capacitor C1, the negative crest value Inn of the current In of the neutral point connection line LN is made larger than the positive crest value Inp, increasing the amount of the charge current of the capacitor C2. By this voltage balance control, the difference between the voltage V1 of the capacitor C1 and the voltage V2 of the capacitor C2 is decreased, and the voltages V1 and V2 of the capacitors can be balanced.

In FIG. 5, the voltage V1 of the capacitor C1 is lower than the voltage V2 of the capacitor C2. By making the voltage balance control effective at time t1, the positive crest value of the current In of the neutral point control line LN is larger than the negative crest value, and the difference between the voltage V1 of the capacitor C1 and the voltage V2 of the capacitor C2 decreases.

In FIG. 5, there is a case in reality that ripples overlap in the current Ia of the inductor L1, the current In of the neutral point connection line LN, the voltage V1 of the capacitor C1, and the voltage V2 of the capacitor C2. In addition, there is a case in reality that a period occurs in which the direction of the a-phase voltage Va and the current Ia of the inductor L1 is opposite to each other due to a control delay or the like, although the controller 1 has a power factor improvement control function.

In the embodiment, the battery 7 is connected between the DC terminals 14 and 15 via the converter 8. In the present invention, a battery can be directly connected between the DC terminals 14 and 15 and charged with relatively small current.

Figure 6:
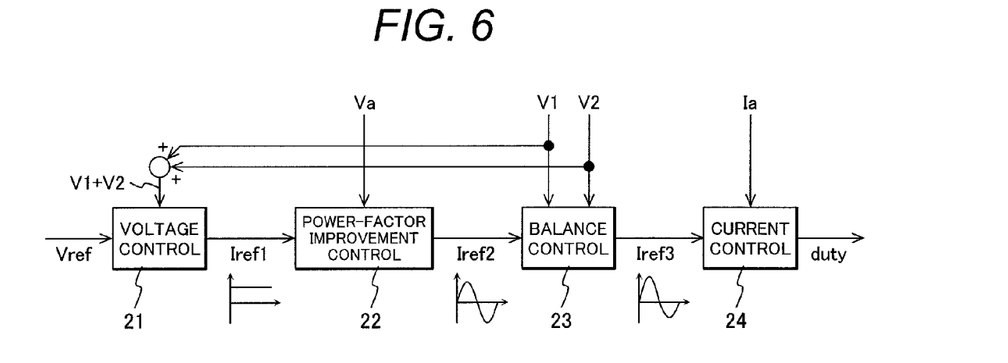
FIG. 6 is a diagram illustrating an example of a circuit configuration of a controller in the capacitor charge mode (C)

FIG. 6 illustrates an example of a circuit configuration of the controller 1 in the capacitor charge mode (C). In this embodiment, the controller 1 has a function to perform the balance control of the voltage V1 of the capacitor C1 and the voltage V2 of the capacitor C2 and to maintain the voltages V1 and V2 at the AC voltage Va or higher. The function can be realized also by circuit configurations other than the illustrated circuit configuration, which is illustrated just for an example. The controller 1 in the capacitor charge mode (C) includes a voltage control unit 21, a power-factor improvement control unit 22, a balance control unit 23, and a current control unit 24, for example.

The voltage control unit 21 supplies a control signal Iref1 so that the total voltage (V1+V2) of the capacitors C1 and C2 is equal to a target voltage Vref. That is, if the total voltage (V1+V2) is lower than the target voltage Vref, the control signal Iref1 is increased. If the total voltage (V1+V2) is higher than the target voltage Vref, the control signal Iref1 is decreased. In the present invention, the target voltage Vref is set to a voltage higher than the total voltage of the crest value of the AC voltage Va and the crest value of the AC voltage Vb. Consequently, power supply from the power supply device 100 can be promptly realized immediately after interruption of a commercial power supply.

The power-factor improvement control unit 22 generates a sine-wave shaped control signal Iref2 having an amplitude proportional to that of the control signal Iref1 and a phase equal to that of the AC voltage Va.

The balance control unit 23 generates a target current Iref3 having the positive crest value Inp higher than the negative crest value Inn if V1 is lower than V2 and generates a target current Iref3 having the negative crest value Inn higher than the positive crest value Inp if V2 is lower than V1, so that the capacitor voltages V1 and V2 are equal to each other.

The current control unit 24 increases a firing signal "duty" if the current Ia of the inductor L1 is smaller than the target current Iref3 and decreases the firing signal "duty" if the current Ia of the inductor L1 is larger than the target current Iref3, so that the current Ia of the inductor L1 is equal to the target current Iref3.

In the period in which the AC voltage Va is positive, the period of the mode C11 is increased and the period of the mode C12 is decreased by increasing the firing signal "duty." In the period in which the AC voltage Va is negative, the period of the mode C22 is increased and the period of the mode C21 is decreased by increasing the firing signal "duty."

[Battery Power Supply Mode (D) at a Time of Power Interruption of AC Power Supply 2]

When a system abnormality such as power supply interruption of the AC power supply 2 is detected, the relay contact RY1 is turned off to shift to the battery power supply mode. The DC power supplied to the DC terminals 14 and 15 is converted to alternating current, and the alternating current is supplied to the AC loads 3 to 5. An operation of outputting AC100V/AC200V will be described as a discharging operation with reference to FIG. 7. Specifically, a discharging operation will be described in which power is supplied from the capacitors C1 and C2 to the capacitors C3 and C4, AC 100V is output to both of the a-phase and the b-phase, and, accordingly, AC200V is output to the ab-phase. Only a case of the positive half cycle of the AC voltage will be described here.

Figure 7:
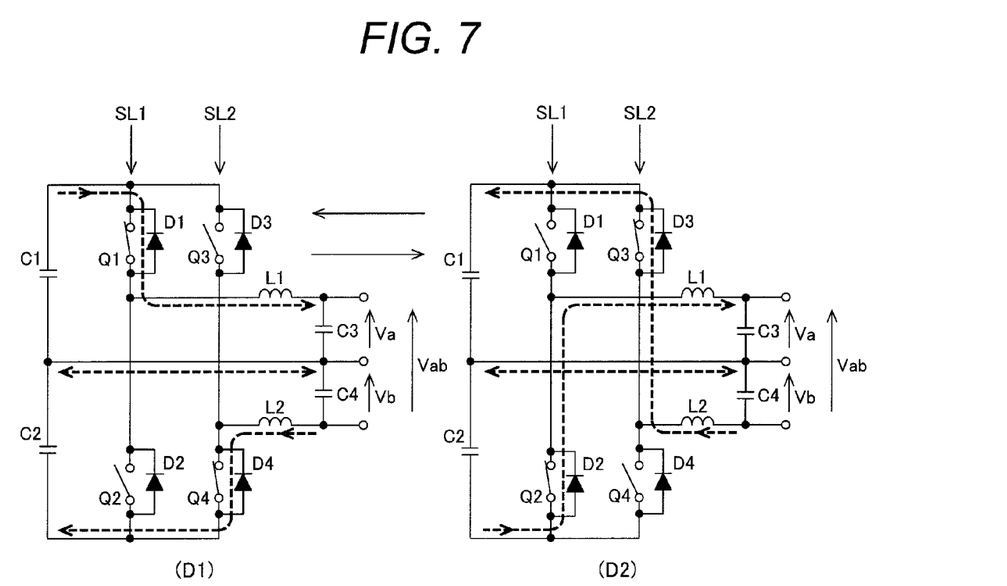
FIG. 7 is a diagram illustrating an example of a circuit configuration of the controller in a battery power supply mode (D) at a time of power interruption of alternating-current power supply 2.

In this discharging operation, the switching elements Q1 to Q4 are operated as follows. In the switching operation, a mode D1 and a mode D2 are alternately executed. In the mode D1, the switching element Q1 on the positive terminal side of the first switching leg SL1 and the switching element Q4 on the negative terminal side of the second switching leg SL2 are set to the on-state, and the others are set to the off-state. In the mode D2, the switching element Q2 on the negative terminal side of the first switching leg SL1 and the switching element Q3 on the positive terminal side of the second switching leg SL2 are set to the on-state, and the others are set to the off-state. The left part in FIG. 7 illustrates the circuit configuration, the current directions, and so on in the mode D1, and the right part in FIG. 7 illustrates the circuit configuration, the current directions, and so on in the mode D2.

In the mode D1, the switching element Q1 is in the on-state, and the voltage of the capacitor C1 is applied to the inductor L1 and the capacitor C3. In addition, the switching element Q4 is in the on-state, and the voltage of the capacitor C2 is applied to the inductor L2 and the capacitor C4. The currents in the inductors L1 and L2 increase with time and are supplied to the capacitors C3 and C4.

When the mode D1 shifts to the mode D2 and the switching element Q1 is turned off, the current in the inductor L1 flowing in the switching element Q1 changes to flow into the diode D2 and returns via the capacitor C2. At this time, the switching element Q2 is turned on.

When the switching element Q4 is turned off, the current in the inductor L2 flowing in the switching element Q4 changes to flow into the diode D3 and returns via the capacitor C1. At this time, the switching element Q3 is turned on. The currents in the inductors L1 and L2 decrease with time and are supplied to the capacitors C3 and C4.

Subsequently, the switching elements Q2 and Q3 are turned off and the switching element Q1 and Q4 are turned on, thereby returning to the mode D1.

By continuous execution of the switching operation between the modes D1 and D2, power is supplied from the capacitors C1 and C2 to the capacitors C3 and C4, AC100V is output to both of the a-phase and the b-phase and, therefore, AC200V can be output to the ab-phase.

With the circuit configuration in FIG. 1, the following operation modes can be used and optionally executed as necessary besides the above-described operation. In this case, the operation modes can be grasped as two modes (DC-AC mode and AC-DC mode) according to the power conversion directions. Further, the DC-AC mode can be divided to a DC-AC mode 1 and a DC-AC mode 2 depending on circuits on the AC side to which power is supplied.

The DC-AC mode 1 of the DC-AC mode is a mode to convert DC power supplied between the DC terminals 14 and 15 to AC power and supply the AC power to the AC power supply 2. In the DC-AC mode 1, the relay contact RY1 is set to the on-state, the switching elements Q1 and Q2 are controlled to pass the current Ia to the inductor L1, and the switching elements Q3 and Q4 are controlled to pass the current Ib to the inductor L2.

The DC-AC mode 2 of the DC-AC mode is a mode to convert DC power supplied between the DC terminals 14 and 15 to AC power and supply the AC power to the AC loads 3 to 5. In the DC-AC mode 2, the relay contact RY1 is set to the off-state, the relay contact RY2 is set to the on-state, the switching elements Q1 and Q2 are controlled to generate the a-phase voltage Va, and the switching elements Q3 and Q4 are controlled to generate the b-phase voltage Vb.

The AC-DC mode is a mode to convert the power of the AC power supply 2 supplied to the AC terminals 11 to 13 to DC power and output the DC power to the DC terminals 14 and 15. In the AC-DC mode, the relay contact RY1 is set to the on-state, the switching elements Q1 and Q2 are controlled to pass the current Ia to the inductor L1, the switching elements Q3 and Q4 are controlled to pass the current Ib to the inductor L2, and the current supplied from the AC power supply 2 is controlled to be in a sine wave shape to increase the power factor. The controller 1 has this power-factor improvement control function.

Figure 8:
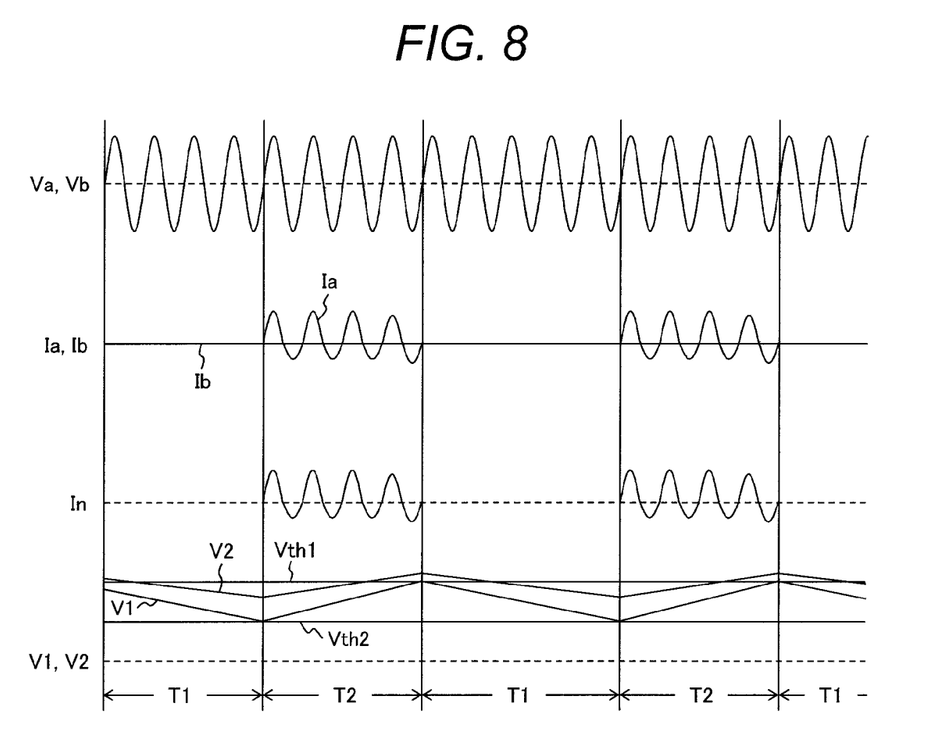
FIG. 8 is a diagram illustrating signals in parts changing with time in another operation in the capacitor charge mode (C).

In the present invention, operation can be performed as illustrated in FIG. 8 without changing the configuration of the power supply device 100 as illustrated in FIG. 1. FIG. 8 illustrates signals changing with time of the AC terminal voltages Va and Vb, the respective currents Ia and Ib of the inductors L1 and L2, the current In of the neutral point connection line LN, and the respective voltages V1 and V2 of the capacitors C1 and C2.

In an operation sequence illustrated in FIG. 8, intermittent control is performed with repetition of starts and stops, thereby providing a pause period to further decrease the loss in the capacitor charge mode (C). If both of the voltage V1 of the capacitor C1 and the voltage V2 of the capacitor C2 are equal to or larger than a threshold value Vth1, the switching operation is stopped. If at least one of the voltage V1 of the capacitor C1 and the voltage V2 of the capacitor C2 is equal to or less than a threshold value Vth2, the switching operation is restarted.

In FIG. 8, the voltage V1 of the capacitor C1 and the voltage V2 of the capacitor C2 decrease gradually in the period T1 due to power consumption by the auxiliary power supply 6 and leakage current of the capacitors C1 and C2. If the electrostatic capacitance of the capacitor C1 is smaller than that of the capacitor C2 or if the leakage current of the capacitor C1 is larger than that of the capacitor C2, the voltage V1 of the capacitor C1 decreases faster than the voltage V2 of the capacitor C2.

When the voltage V1 of the capacitor C1 reaches the threshold value Vth2, the switching operation is restarted and the state enters in the period T2. The capacitors C1 and C2 are charged, and the voltage V1 of the capacitor C1 and the voltage V2 of the capacitor C2 rise. At this time, as the operation sequence illustrated in FIG. 5, the positive crest value of the current In of the neutral point connection line LN is larger than the negative crest value to decrease the difference between the voltage V1 of the capacitor C1 and the voltage V2 of the capacitor C2 because the voltage V1 of the capacitor C1 is lower than the voltage V2 of the capacitor C2.

When both of the voltage V1 of the capacitor C1 and the voltage V2 of the capacitor C2 are equal to or larger than the threshold value Vth1, the switching operation is stopped, thereby returning to the state in the period T1.

The embodiments of the present invention have been described above. In the embodiments, the capacitors C1 and C2 are charged while the device is on standby to promptly output AC voltage. The operating method of the present invention can be applied to a case of charging the battery 7 with relatively small current, obtaining a merit to reduce a loss by stopping the switching elements Q5 and Q6. As described above, the present invention can be widely applied to power supply devices of converting power bidirectionally between the single-phase three-wire AC line and the DC line.

What is claimed is:

1. A power supply device comprising:
   a first switching leg in which a series circuit of a first switching element and a second switching element is connected between DC terminals;
   a second switching leg in which a series circuit of a third switching element and a fourth switching element is connected between the DC terminals;
   a first capacitor leg in which a series circuit of a first capacitor and a second capacitor is connected between the DC terminals;
   a second capacitor leg in which a series circuit of a third capacitor and a fourth capacitor is connected between AC terminals and in which a connection point of the third and fourth capacitors and a connection point of the first and second capacitors are connected by a neutral point connection line;
   a first inductor connected between a connection point of the first and second switching elements and one of the AC terminals;
   a second inductor connected between a connection point of the third and fourth switching elements and another of the AC terminals;
   a controller configured to control the first to fourth switching elements;
   an AC power supply connected between the AC terminals and the connection point of the third and fourth capacitors; and
   a DC power supply connected between the DC terminals,
   wherein the controller is configured to operate the switching elements of the first and second switching legs so as to charge the first and second capacitors to a voltage higher than a voltage crest value of the AC power supply by using power of the AC power supply,
   wherein the controller is configured to operate the switching elements by comparing voltages of the first and second capacitors and a set voltage, and configured to make the third and fourth switching elements in the second switching leg in an off-state and make the first and second switching elements in the first switching leg alternately in an on-state to charge the first and second capacitors to a voltage higher than the voltage crest value of the AC power supply, and wherein the set voltage is determined to a voltage higher than the voltage crest value of the AC power supply.

2. The power supply device according to claim 1,
wherein the controller is configured to have a power-factor improvement control function of controlling current supplied from the AC power supply into a sine wave shape.

3. The power supply device according to claim 1, further comprising:
diodes which are connected to each of the first to fourth switching elements in inverse-parallel connection.

4. The power supply device according to claim 1,
wherein the controller is configured to have a DC-AC mode 1 of supplying power of the DC power supply to the AC power supply.

5. The power supply device according to claim 1,
wherein both ends of the second capacitor leg and the connection point of the third and fourth capacitors are set as the AC terminals,
wherein a relay contact is provided between the AC terminals and the AC power supply, and
wherein the controller is configured to have a DC-AC mode 2 of supplying power of the DC power supply to an AC load connected to the AC terminals by setting the relay contact to the off-state.

6. A power supply device comprising:
a first switching leg in which a series circuit of a first switching element and a second switching element is connected between DC terminals;
a second switching leg in which a series circuit of a third switching element and a fourth switching element is connected between the DC terminals;
a first capacitor leg in which a series circuit of a first capacitor and a second capacitor is connected between the DC terminals;
a second capacitor leg in which a series circuit of a third capacitor and a fourth capacitor is connected between AC terminals and in which a connection point of the third and fourth capacitors and a connection point of the first and second capacitors are connected by a neutral point connection line;
a first inductor connected between a connection point of the first and second switching elements and one of the AC terminals;
a second inductor connected between a connection point of the third and fourth switching elements and another of the AC terminals;
a controller configured to control the first to fourth switching elements;
an AC power supply connected between the AC terminals and the connection point of the third and fourth capacitors; and
a DC power supply connected between the DC terminals,
wherein the controller is configured to operate the switching elements of the first and second switching legs so as to charge the first and second capacitors to a voltage higher than a voltage crest value of the AC power supply by using rower of the AC power supply, and
wherein the controller is configured to have a voltage balance control function of increasing current in the neutral point connection line flowing from the connection point of the first and second capacitors to the connection point of the third and fourth capacitors if a voltage of the first capacitor is lower than a voltage of the second capacitor, and increasing current in the neutral point connection line flowing from the connection point of the third and fourth capacitors to the connection point of the first and second capacitors if the voltage of the second capacitor is lower than the voltage of the first capacitor.

7. The power supply device according to claim 6,
wherein a direction of current in the neutral point connection line is defined as positive flowing from the connection point of the first and second capacitors to the connection point of the third and fourth capacitors, and
wherein the controller is, as the voltage balance control function, configured to set a positive crest value of the current in the neutral point connection line to be larger than a negative crest value if the voltage of the first capacitor is lower than the voltage of the second capacitor, and configured to set the negative crest value of the current in the neutral point connection line to be larger than the positive crest value if the voltage of the second capacitor is lower than the voltage of the first capacitor.

8. The power supply device according to claim 6,
wherein the controller is, as the voltage balance control function, configured to stop a switching operation of the first to fourth switching elements if the voltages of the first and second capacitors are higher than a first threshold value, and configured to restart the stopped switching operation of the first to fourth switching elements if at least one of the voltages of the first and second capacitors is lower than a second threshold value.

9. The power supply device according to claim 6, further comprising:
a third switching leg in which a fifth switching element and a sixth switching element are connected in series between the DC terminals; and
a third inductor connected between a connection point of the fifth and sixth switching elements and the connection point of the first and second capacitors,
wherein the controller is, as the voltage balance control function, configured to stop a switching operation of the fifth and sixth switching elements.

10. A method of operating a power supply device,
the device comprising:
a first switching leg in which a series circuit of a first switching element and a second switching element is connected between DC terminals;
a second switching leg in which a series circuit of a third switching element and a fourth switching element is connected between the DC terminals;
a first capacitor leg in which a series circuit of a first capacitor and a second capacitor is connected between the DC terminals;
a second capacitor leg in which a series circuit of a third capacitor and a fourth capacitor is connected between AC terminals and in which a connection point of the third and fourth capacitors and a connection point of the first and second capacitors are connected by a neutral point connection line;
a first inductor connected between a connection point of the first and second switching elements and one of the AC terminals;
a second inductor connected between a connection point of the third and fourth switching elements and another of the AC terminals;
a controller configured to control the first to fourth switching elements;

an AC power supply and a load connected between the AC terminals and the connection point of the third and fourth capacitors, the AC power supply and the load in parallel to each other; and a DC power supply connected between the DC terminals, and the method comprising a step of:

operating the switching elements of the first and second switching legs by the controller in a normal operation state of supplying power from the AC power supply to the load, so as to charge the first and second capacitors to a voltage higher than a voltage crest value of the AC power supply by using power of the AC power supply, and operating the switching elements by comparing voltages of the first and second capacitors and a set voltage, and making the third and fourth switching elements in the second switching leg in an off-state and making the first and second switching elements in the first switching leg alternately in an on-state to charge the first and second capacitors to a voltage higher than the voltage crest value of the AC power supply, wherein the set voltage is determined to a voltage higher than the voltage crest value of the AC power supply.

11. The method of operating a power supply device according to claim 10, wherein the controller starts to supply power having, as an initial value, a voltage of the capacitor charged to a voltage higher than the voltage crest value of the AC power supply if power is not supplied from the AC power supply to the load due to abnormality in the AC power supply.

* * * * *